United States Patent
Condie et al.

(10) Patent No.: US 9,367,539 B2
(45) Date of Patent: Jun. 14, 2016

(54) TECHNIQUES FOR AUTOMATED DOCUMENT TRANSLATION

(75) Inventors: Stephen Condie, Redmond, WA (US); Charles Reid, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/288,147

(22) Filed: Nov. 3, 2011

(65) Prior Publication Data
US 2013/0117008 A1 May 9, 2013

(51) Int. Cl.
*G06F 17/21* (2006.01)
*G06F 17/28* (2006.01)
*G06F 17/24* (2006.01)

(52) U.S. Cl.
CPC ............ *G06F 17/289* (2013.01); *G06F 17/218* (2013.01)

(58) Field of Classification Search
CPC ...................................................... G06F 17/27
USPC ........................................................ 715/236
See application file for complete search history.

(56) References Cited

U.S. PATENT DOCUMENTS

| | | | | | |
|---|---|---|---|---|---|
| 4,864,503 | A | * | 9/1989 | Tolin ................... | G06F 17/2755 704/2 |
| 5,761,631 | A | * | 6/1998 | Nasukawa ......................... | 704/9 |
| 6,470,306 | B1 | | 10/2002 | Pringle et al. | |
| 6,691,279 | B2 | | 2/2004 | Yoden et al. | |
| 7,139,696 | B2 | * | 11/2006 | Tokieda et al. .................... | 704/8 |
| 7,729,540 | B2 | * | 6/2010 | Koyama et al. ............... | 382/181 |
| 8,050,906 | B1 | | 11/2011 | Zimmerman et al. | |
| 2002/0188435 | A1 | * | 12/2002 | Labarge ............................ | 704/1 |
| 2004/0098668 | A1 | * | 5/2004 | Vehkomaki ................... | 715/513 |

(Continued)

FOREIGN PATENT DOCUMENTS

CN 101261633 A 9/2008
KR 10-2004-0016198 2/2004

OTHER PUBLICATIONS

Lavie et al., "Experiments with a Hindi-to-English Transfer-Based MT System Under a Miserly Data Scenario", ACM, 2003, pp. 143-163.*

(Continued)

*Primary Examiner* — James J Debrow
(74) *Attorney, Agent, or Firm* — Danielle Johnston Holmes; Micky Minhas

(57) ABSTRACT

Techniques for automated document translation are described. An apparatus may comprise a translatable content component, an intermediate component, and a translation management component. The translatable content component may be generally operative to extract translatable content from an original document, and to construct a translated document based on extracted translated content, the translated document comprising a translation of the original document from a first language to a second language. The intermediate component may be operative to create one or more intermediate documents from extracted translatable content, and to extract translated content from one or more translated intermediate documents. The translation management component operative to transmit the one or more intermediate documents to a translation service for translation from a first language to a second language and to receive one or more translated intermediate documents from the translation service. Other embodiments are described and claimed.

20 Claims, 8 Drawing Sheets

(56) References Cited

U.S. PATENT DOCUMENTS

| | | | |
|---|---|---|---|
| 2004/0205671 A1* | 10/2004 | Sukehiro et al. | 715/532 |
| 2006/0116866 A1 | 6/2006 | Suzuki et al. | |
| 2006/0206305 A1* | 9/2006 | Kimura et al. | 704/2 |
| 2007/0070443 A1 | 3/2007 | Kim | |
| 2007/0208997 A1* | 9/2007 | Jiang | C12Q 1/6806 715/234 |
| 2007/0239423 A1* | 10/2007 | Miller | 704/2 |
| 2008/0040095 A1 | 2/2008 | Sinha et al. | |
| 2008/0126076 A1* | 5/2008 | Ming et al. | 704/4 |
| 2008/0228465 A1* | 9/2008 | Ono | 704/4 |
| 2008/0300863 A1* | 12/2008 | Smith | 704/9 |
| 2009/0030671 A1* | 1/2009 | Kwon | G06F 17/211 704/2 |
| 2010/0235162 A1 | 9/2010 | Faddoul et al. | |
| 2011/0046940 A1 | 2/2011 | Tanaka et al. | |
| 2011/0107201 A1 | 5/2011 | Kim et al. | |
| 2011/0231181 A1 | 9/2011 | Furuuchi et al. | |
| 2012/0005571 A1* | 1/2012 | Tang et al. | 715/234 |
| 2012/0072831 A1* | 3/2012 | Li | 715/236 |

OTHER PUBLICATIONS

Foster, Tim., "Using Translation Technology at Sun Microsystems", Retrieved at <<http://wikis.sun.com/download/attachments/61911250/translation_technology_sun.pdf>>, White Paper, Retrieved Date: Aug. 24, 2011, pp. 7.

"Second Office Action Received for China Patent Application No. 201210435083.8", Mailed Date: Jun. 24, 2015, 11 Pages.

Second Office Action Received for China Patent Application No. 201210435083.8, Mailed Date: Jun. 24, 2015, 11 Pages.

European extended Search Report Issued in European Patent Application No. 12845611.8, Mailed Date: Sep. 28, 2015, 6 Pages.

European Communication mailed in European Patent Application No. 12845611.8, Mailed Date: Oct. 15, 2015, 1 page.

Chinese Office Action in Application 201210435083.8, mailed Nov. 4, 2014, 14 pgs.

PCT International Search Report and Written Opinion in International Application PCT/US2012/063130 mailed Mar. 4, 2013, 6 pgs.

* cited by examiner

US 9,367,539 B2

TECHNIQUES FOR AUTOMATED DOCUMENT TRANSLATION

BACKGROUND

Automated translation between languages has continued to become increasingly reliable, such that the increasing demand for translation is increasingly being met by automated translation services. Given a document in a universal standard such as hypertext markup language (HTML), automated translation services can produce a translated HTML document within a matter of moments. However, document creation and editing programs, such as word processors, allow for considerable control over document layout and style, beyond what may be possible with HTML. While some editing programs may allow for conversion of a document to HTML format, making the converted document suitable for transmission to an automated translation service, significant layout and style information may be lost such that a received translated HTML document is missing desired layout and style information from the original non-HTML document. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for automated document translation. Some embodiments are particularly directed to techniques for automated document translation which produce a translated document that conserves layout and style information from the original. This conservation of layout and style information allows for the production of high-fidelity translated documents which contain the full range of rich layout and style options available in modern editing programs.

In one embodiment, for example, an apparatus may comprise a translatable content component operative to extract translatable content from an original document, an intermediate component operative to create one or more intermediate documents from the extracted translatable content, and a translation management component operative to transmit the one or more intermediate documents to a translation service for translation from a first language to a second language and to receive one or more translated intermediate documents from the translation system. The intermediate component may be further operative to extract translated content from the one or more translated intermediate documents and the translatable content component may be operative to construct a translated document based on the extracted translated content, the translated document comprising a translation of the original document from the first language to the second language. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
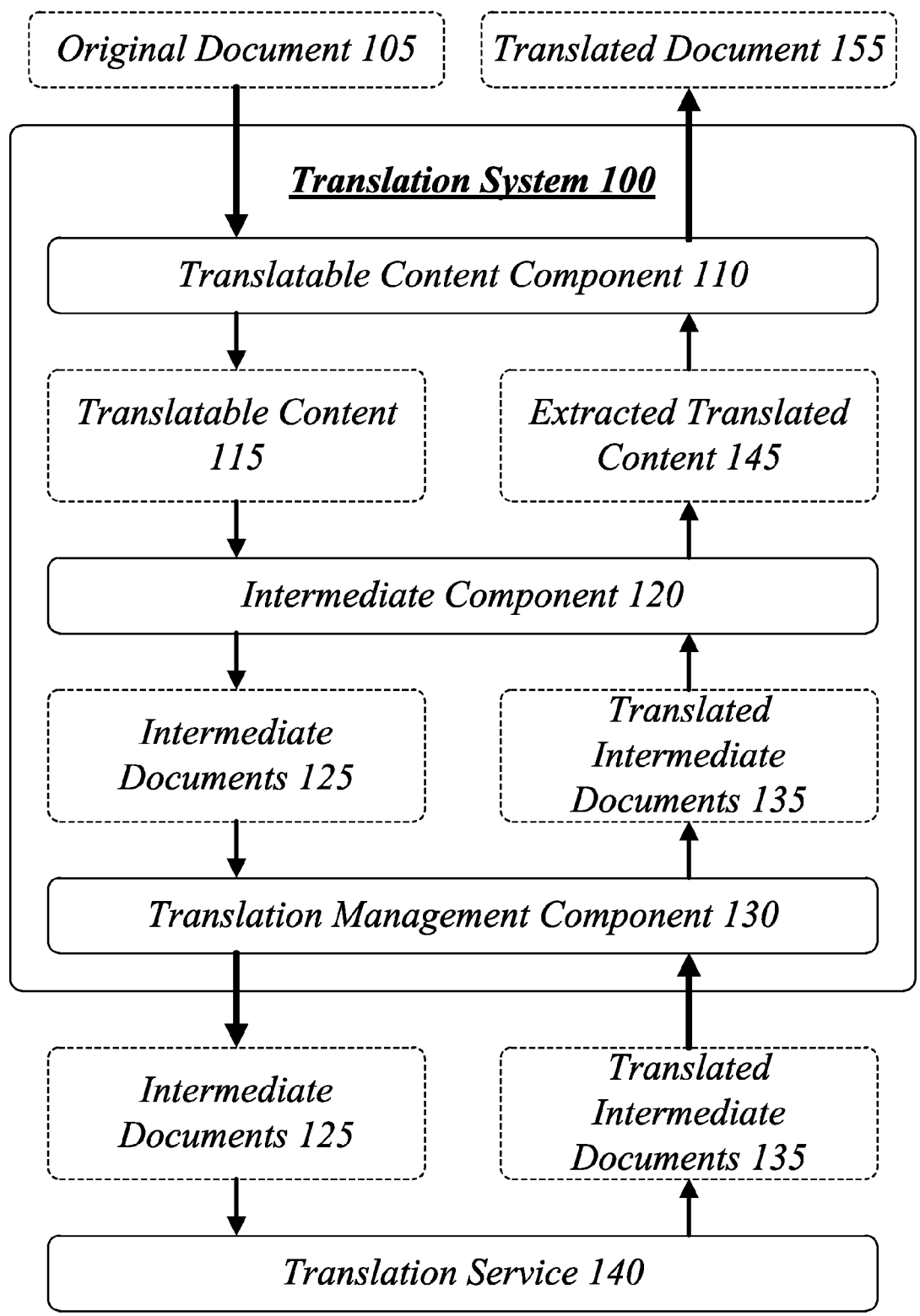
FIG. 1 illustrates an embodiment of a system for automated document translation.

Various embodiments are generally directed to techniques for automated document translation. Some embodiments are particularly directed to techniques for automated document translation which produce a translated document in the same format as the original that preserves layout and style information. This makes the process of using an automated translation service easier and improves the utility of the result. As such, cost and complexity for translating a document to one or more alternate languages are reduced. In particular, while automated translation techniques which produce translated documents in a different format, without full conservation of document structure and text formatting, may be somewhat adequate for users attempting to read a received document written in a language they can't read, users wishing to distribute a translated document will be benefited by the translated document possessing all of the layout and style information of the original. And even those users merely wishing to read a translation of a received document will be benefited by the translated document having a same level of fidelity in layout and style to the original. As a result, the embodiments can improve the practicality and user experience of automated document translation.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a translation system 100. In one embodiment, the translation system 100 may comprise a computer-implemented translation system 100 having one or more software applications and/or components. Although the translation system 100 shown in FIG. 1 has a limited number of elements in a certain topology, it may be appreciated that the system 100 may include more or less elements in alternate topologies as desired for a given implementation.

The translation system 100 may implement various techniques for automated document translation. More particularly, the translation system 100 may receive an original document 105 and produce a translated document 155, where the translated document 155 is a translation of the original document 105 from a first language to a second language. The first and second languages may comprise human languages, such as an English language, a Korean language, a French language, a Spanish language, and so forth.

The translated document 155 may comprise a document in the same format as the original document 105, where the format may refer to a file format for an application program. Examples for an application program may include without limitation a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

The translated document 155 may possess a same or similar document structure, formatting options, styles, and/or text formatting as the original document 105. Document structure may refer to the layout of the document, such as the positioning and properties of textual elements. Document structure may refer to the presence, properties, and positioning of non-textual elements such as images, embedded audio or video, embedded spreadsheets, or tables. Document structure may refer to the relative positioning of textual elements and non-textual elements, such as the positioning of a textual element within the cell of a table. Document structure may refer generally to any property of a document beyond the textual content and the formatting of that textual content. Text formatting may refer to the formatting properties of text, such as font, size, typeface, and color. Text formatting may generally refer to any of the well-known methods of formatting text. Examples of a formatting option or style may include without limitation a font, a font style, a font size, a font color, an underline style, an underline color, an effect, a text effect, a text fill, a text outline, an outline style, a text shadow, a text reflection, a text glow, a text edge, a text three dimensional format, and so forth. The embodiments are not limited in this context.

The translation system 100 may make use of a translation service 140. The translation service 140 may comprise a machine-implemented automated translation service which uses a computer program to translate text from a first language to a second language. In some embodiments, the translation service 140 may comprise an Internet or Web-based commercial service for the translation of documents. In other embodiments, the translation service 140 may comprise a local translation application or service implemented by the translation system 100.

The translation service 140 may request that documents submitted to the service be in a particular format, such as a standardized intermediate format, and may produce documents in the same standardized intermediate format. For instance, the translation service 140 may only be arranged to accept documents in a specific markup language, such as the HTML or extensible markup language (XML) format. In one embodiment, the translation server 140 may receive as input a document in an HTML format and may produce translations formatted in HTML. The translation service 140 may request that documents submitted to the service be of a defined length, such as a maximum length or a maximum number of pages. The translation service 140 may be operative to maintain the document structure and text formatting settings of documents in the intermediate format, such as the layout and style options available to an HTML-formatted document. However the intermediate format, such as the HTML format, may not support the full range of document structure properties, layout options, text formatting options, or general style options available in the format of the original document 105.

While general techniques may exist for the conversion of the original document 105 to a document in the intermediate format, such as a conversion from a Microsoft Word-formatted document to an HTML-formatted document, this conversion may lose visual fidelity in the form of document structure properties, layout options, text formatting options, or general style options from the original document 105. While general techniques may exist for the conversion of an intermediate format document to a document in the format of the original document 105, such as a conversion from an HTML-formatted document to a Microsoft Word®-formatted document, because the structure properties, layout options, text formatting options, or general style options from the original document 105 were already lost in conversion to the intermediate format, those properties and options could not be reconstructed through this conversion process. As such, it may be advantageous for the translation system 100 to conserve these structure properties, layout options, text formatting options, and general style options for reintroduction into the document to produce a translated document 155 which possess the same structure properties, layout options, text formatting options, and general style options as the original document 105.

It will be appreciated that while the illustrated embodiment of FIG. 1 shows the translation service 140 as being external to the translation system 100, that in some embodiments the translation service 140 may be implemented by the same device, system, service, or entity as the translation system 100.

As shown in the illustrated embodiment of FIG. 1, the translation system 100 includes translatable content component 110, an intermediate component 120, and a translation management component 130. The translatable content component 110 may be generally operative to extract translatable content 115 from an original document 105, and to construct a translated document 155 based on extracted translated content 145, the translated document 155 comprising a translation of the original document 105 from a first language to a second language. The intermediate component 120 may be operative to create one or more intermediate documents 125 from extracted translatable content 115, and to extract translated content 145 from one or more translated intermediate documents 135. The translation management component operative to transmit the one or more intermediate documents 125 to a translation service 140 for translation from a first language to a second language and to receive one or more translated intermediate documents 135 from the translation service 140.

In general, the translatable content component 100 may be operative to extract translatable content 115 from an original document 105. Translatable content 115 may refer to the textual content of the original document 105 along with information regarding document structure and text formatting for the purpose of eventually reconstructing the document structure and text formatting of the original document 105. In one embodiment, the technique used for extracting the translatable content 115 from the original document 105 may comprise, for example, identifying one or more paragraphs in the original document 105, extracting text from the one or more paragraphs, generating one or more style identifiers for the extracted text, identifying one or more runs of text, and generating one or more annotation identifiers for inline objects in the original document 105.

A paragraph may refer to portion of text which is laid out with the same properties in the original document 105 and in the same location in the document 105. The properties may refer to document properties other than formatting, and may refer to a type of text, such as a title. In a word processing document, some paragraphs may be literal grammatical paragraphs, which are one or more contiguous sentences without a paragraph break between them. If the original document 105 includes a table, each cell of the table would comprise a separate paragraph. Generally, a paragraph may refer to a portion of text which can be treated as a single unit for positioning in the original document 105.

A style identifier may refer to a unique set of text formatting settings within a paragraph. For example, a paragraph might contain text formatted in three styles: (1) plain (e.g., the text has no special formatting); (2) boldface (e.g., the text is displayed in bold); and (3) both italicized and boldfaced (e.g., the text is displayed in both bold and italics). Three style identifiers would therefore be generated for the text extracted from the document, each one associated with one of the unique sets of text formatting settings within the paragraph. In various embodiments, a style identifier may comprise a number, a code, or any other signifier which does not directly indicate text formatting settings, where determining the proper text formatting settings depends on a translation table associating style identifiers with text formatting settings.

A paragraph may be further broken down or segmented into one or more "runs," which may refer to a contiguous portion of text within the paragraph that shares the same text formatting. A run would therefore by a contiguous portion of text which could have the same style identifier associated with it. A paragraph may contain more runs than it does unique sets of text formatting—may contain more runs than it does style identifiers—as, for example, sequences of text which alternate back and forth between two styles could produce an arbitrarily high number of runs using only two styles.

The translatable content component 115 may be operative to store the generated style identifiers in a table which associates the style identifiers for each paragraph with the set of text formatting corresponding to that style identifier for that paragraph. By doing so, a run may be associated with a particular style identifier without needing to store the corresponding set of text formatting settings with the run, as the table will empower the retrieval of the set of text formatting settings based on the paragraph and style identifier. As such, the translatable content 115, by storing each paragraph as a set of runs with associated style identifiers, may contain sufficient information for the reconstruction of the text formatting for the text of the paragraph without specifically storing the actual text formatting options for the text of the paragraph.

Inline objects may be non-textual objects within a paragraph, or any object within a paragraph that is not suitable for translation but which is positioned relative to specific portions of the text of a paragraph. For example, some paragraphs may contain inline images or embedded formulas between certain words, which words might move during the translation of the document. Similarly, some paragraphs may contain footnotes markers attached to specific words. For each such inline object, an annotation identifier is generated that marks the location of the inline object. As with style identifiers, a table may be used to map between an annotation identifier and the inline object corresponding to the annotation identifier.

In general, the intermediate component 120 may be operative to create one or more intermediate documents 125 from the extracted translatable content 115. In some embodiments, the intermediate documents 135 may be HTML-formatted documents which comprise the text of the original document 105 along with markup tags which mark the text of the original document 105 in such a way as to associate that text with the relevant paragraphs, runs, style identifiers, and annotation identifiers from the extracted translatable content 115 of original document 105. The process of generating the intermediate documents 125 may comprise: creating paragraph tags for each identified paragraph, identifying a predominant style identifier for each paragraph, associating each paragraph with its predominant style identifier, identifying off-style runs in each paragraph, creating style tags for each off-style run, and creating annotation tags from the annotation identifiers.

A paragraph tag may refer to a pair of tags placed on either side of a paragraph, the tags indicating the start and end of a paragraph, such as is used by the HTML format. It will be appreciated that, as discussed above, one or more of the identified paragraphs may not correspond to a typical paragraph in the grammatical sense, and may instead refer to, for example, the contents of a single cell of a table. It will be appreciated that while the intermediate format, such as the HTML format, may support the use of tables, that the intermediate component 120 may not create an HTML table for text from the original document 105 that was originally in a table. Instead, the intermediate component 120 may create a tagged paragraph for the contents of each cell using the same technique as for any other paragraph, such as by creating pairs of paragraph tags bracketing the contents of each cell. The extracted text within the translatable content 115 corresponding to that paragraph would then be placed between the paragraph tags.

A predominant style identifier for a paragraph may refer to the style identifier associated with the most characters in a paragraph. The predominant style identifier may be associated with the paragraph as a whole, such as by including the predominant style identifier within or otherwise as part of one of the paragraph tags for the paragraph. Off-style runs within a paragraph may refer to those runs within the paragraph which are not associated with the predominant style identifier. These are runs from the original paragraph with a style other than the predominant style of the paragraph. Style tags may be created for each off-style run, the style tags comprising the style identifiers from the extracted translatable content 115, as stored in a table mapping between style identifiers and sets of text formatting. As these style tags would only contain these identifiers, not direct formatting options, the style tags would therefore not contain the text formatting options for the original text from the original document 105. Instead, each would contain the style identifier which could be mapped to specific set of text formatting based on the style identifier table. As such, the intermediate documents 125 would not contain text formatting options such as boldface or italics, even where the text from the original document 105 was in a format, such as boldface, supported by an intermediate format such as HTML.

The intermediate component 120 may be operative create a plurality of intermediate documents 125 from the extracted translatable content 115 to accommodate a defined or maximum number of pages for the translation service 140. Some translation services may place a limit on the number of pages they may process. For example, if a translation service uses a flat billing rate for machine translation, it may desire to limit the amount of text which may be translated for that rate. As such, documents larger than that set length of text, such as longer than a specified number of pages, may need to be broken up into multiple documents prior to transmission to the translation service 140. It will be appreciated that each of the plurality of intermediate documents 125 may each have associated with them an identifier to aid in joining the plurality of documents into a single document or otherwise capturing the ordering of the translated content of the plurality of documents.

An annotation tag may refer to any sort of tag which can be placed at a specific position with a paragraph with the expectation that the translation service 140 will maintain a relative position for the annotation tag to an adjacent word during translation. For example, in a translation from English to Spanish, if the word "brother" in English were to have a footnote attached to it, an annotation tag would be created and associated with the word "brother" so that the translation service 140 would produce the Spanish translation "hermano", with the word "hermano" associated with the same annotation tag, such that the relative positioning of the annotation tag could be maintained.

In general, the translation management component 130 may be operative to transmit the one or more intermediate documents 125 to a translation service 140 for translation from a first language to a second language and to receive one or more translated intermediate documents 135 from the translation service 140. The translated intermediate documents 135 may generally correspond to a translation of the intermediate documents 125 from the first language to the second language. The translation management component 130 may be operative to manage issues such as authentication to the translation service 140, billing for the translation service 140, or any other task needed for using an external, third-party translation service 140. Alternatively, in embodiments where the translation service 140 is an internal translation service to the translation system 100, the translation management component 130 may be operative to manage the instantiation or instigation of the internal translation process.

In general, the intermediate component 120 may be operative to extract translated content 145 from the one or more translated intermediate documents 135. The extracting of translated content 145 may generally correspond to a reversal of the process of creating intermediate documents 125. In one embodiment, the process of generating the extracted translated content 145 may comprise identifying one or more translated paragraphs in the translated intermediate documents, extracting translated text from the one or more translated paragraphs, associating the translated text of each translated paragraph with the associated predominant style identifier for the translated paragraph, identifying translated off-style runs in each translated paragraph, associating style identifiers with the text of each identified translated off-style run, identifying annotation tags in the translated intermediate documents, and associating annotation identifiers from the identified annotation tags with their place in the extracted translated text.

Generally, each of the identification and associating steps listed above may comprise identifying the same tags and identifiers previously generated and used by the intermediate component 120 in the generation of intermediate documents 125. For instance, identifying paragraphs may comprise identifying paragraph tags within the translated intermediate documents 135. Associating the translated text of each translated paragraph with the associated predominant style identifier for the translated paragraph may comprise extracting the predominant style identifier from the paragraph tags used for that paragraph. Identifying translated off-style runs in each translated paragraph may comprise identifying style tags within each of the identified paragraph, where a section of text bracketed by style tags comprises a run. Associating style identifiers with the text of each identified translated off-style run may comprise extracting the style identifier from the style tags used for that run. Identifying annotations in the translated intermediate documents may comprise identifying annotation tags within the translated intermediate documents 135. Associating annotation identifiers from the identified annotations with their place in the extracted translated text may comprise extracting the annotation identifier from the annotation tag used for that annotation.

In general, the translatable content component 110 may be operative to construct a translated document 155 based on the extracted translated content 145, the translated document 155 comprising a translation of the original document 105 from the first language to the second language. The translatable content component may be operative to construct the translated document 155 based on the extracted translated content 145 by replacing the text from the one or more paragraphs of the original document with the extracted translated text from the translated paragraphs of the translated document, wherein styles are assigned to the extracted translated text using the associated style identifiers, wherein the inline objects from the original document 105 are placed in the translated document 155 based on the annotation identifiers associated with the extracted translated text. Generally, this process may make use of the style identifier and annotation identifier tables discussed above to map from a style identifier to a set of text formatting and to map from an annotation identifier to an inline object.

Figure 2:
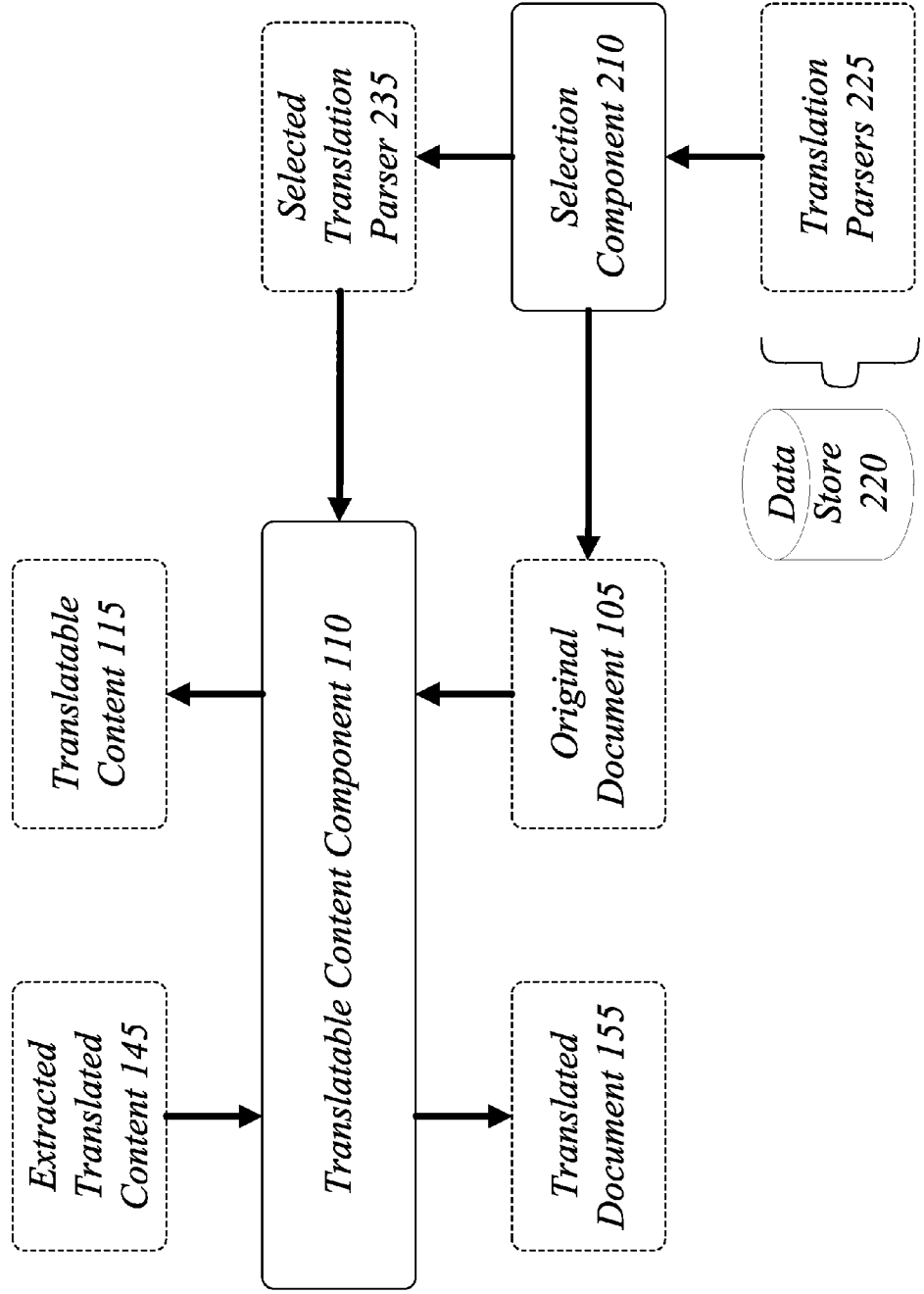
FIG. 2 illustrates an embodiment of selecting a translation parser for a system for automated document translation.

With reference to FIG. 2 and continuing reference to FIG. 1, the translation system 100 may further comprise a selection component 210. Same-numbered elements in FIG. 2 from FIG. 1 represent the same elements in FIG. 2 as they do in FIG. 1. A data store 220 may contain one or more translation parsers 225 which may comprise libraries, dynamically loaded libraries (DLLs), modules, applications, sets of instructions, templates, or any other mechanism of storing a means of parsing and translating between the intermediate format and the format of the original document 105, and consequently between the intermediate format and the format of the translated document 155. As discussed above, the format, such as an application file format, may contain editing options, such as document structure settings or text formatting settings, which cannot be completely represented with the intermediate format. If the translation system 100 is to be able to operate on a variety of application file formats, the parsing of these file formats may be particular to the specific file format. For example, parsing, extracting content from, and reconstructing a Microsoft Word document may use different parsing and formatting rules from parsing, extracting content from, and reconstructing a Microsoft PowerPoint document. By placing a portion of the translation system 100 within a dynamically loaded translation parser, the translation system 100 may become more efficient by virtue of only needing to contain in memory the parsing rules for the specific file format being parsed. Further, by placing a portion of the translation system 100 within a dynamically loaded translation parser, the translation system 100 may be extended to accommodate additional file formats, such as third-party file formats, through the inclusion of additional libraries or modules, without the need to recompile or otherwise modify the rest of the translation system 100.

As such, the selection component 210 may be operative to select a translation parser 235 from a plurality of translation parsers 225 for the original document 105 based on a document type of the original document 105. The translatable content component 110 may be operative to extract the translatable content 115 from the original document 105 using the selected translation parser 235. The translatable content component 110 may be operative to construct the translated document 155 based on the extracted translated content 145 using the selected translation parser 235. In some embodiments, the type of a document may comprise the file format of the document, such as an application file format, for example one of the Microsoft Word file formats or one of the Microsoft PowerPoint file formats.

It will be appreciated that the format for the storage and communication of the translatable content 115 and the extracted translated content 145 is independent of the file format of the original document 105 and the translated document 155. Similarly, the intermediate format used for the intermediate documents 125 and the translated intermediate documents 135 is independent of the file format of the original document 105 and the translated document 155. As such, the intermediate component 120 and the translation management component 130 may operate without knowledge of the file format of the original document 105 and the translated document 155, and may operate without the use of the selected translation parser 235 or any other file-format specific library or module other than those which may be used in the processing of the intermediate format or the format for the translatable content 115 and extracted translated content 145. As a result, accommodation for different file-formats may be segregated to the operations of translatable content component 110 and may be made modular and dynamically extendable through the use of translation parsers 225.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be needed for a novel implementation.

Figure 3A:
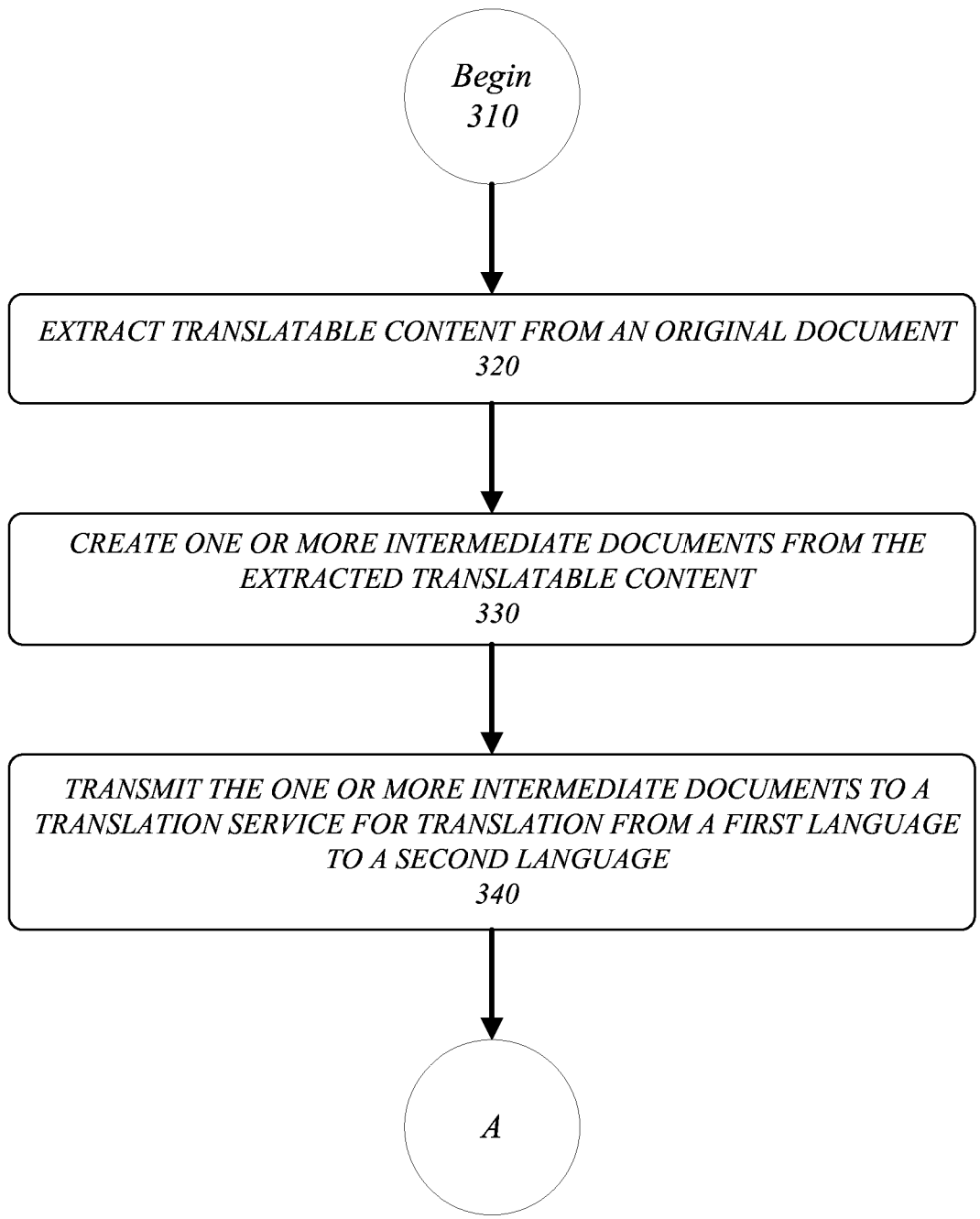
FIG. 3A illustrates an embodiment of a second logic flow for automated document translation.

FIG. 3A illustrates one embodiment of a logic flow 300. The logic flow 300 may be representative of some or all of the operations executed by one or more embodiments described herein. For example, the logic flow 300 may represent operations for the translation system 100.

Operations for the logic flow 300 are initiated at block 310.

In block 320, translatable content is extracted from an original document. The process of extracting translatable content from an original document may comprise the operations of identifying one or more paragraphs in the original document, extracting text from the one or more paragraphs, generating one or more style identifiers for the extracted text, identifying one or more runs of text, and, generating one or more annotation identifiers for inline objects in the original document.

In block 330, one or more intermediate documents are created from the extracted translatable content. The process of creating the one or more intermediate documents may comprise the operations of creating paragraphs tags for each identified paragraph, identifying a predominant style identifier for each paragraph, associating each paragraph with its predominant style identifier, identifying off-style runs in each paragraph, creating style tags for each off-style run, and creating annotation tags from the annotation identifiers. The process of creating the one or more intermediate documents may comprise creating a plurality of intermediate documents from the extracted translatable content to accommodate a defined or maximum number of pages for the translation service.

In block 340, the one or more intermediate documents are transmitted to a translation service for translation from a first language to a second language.

Figure 3B:
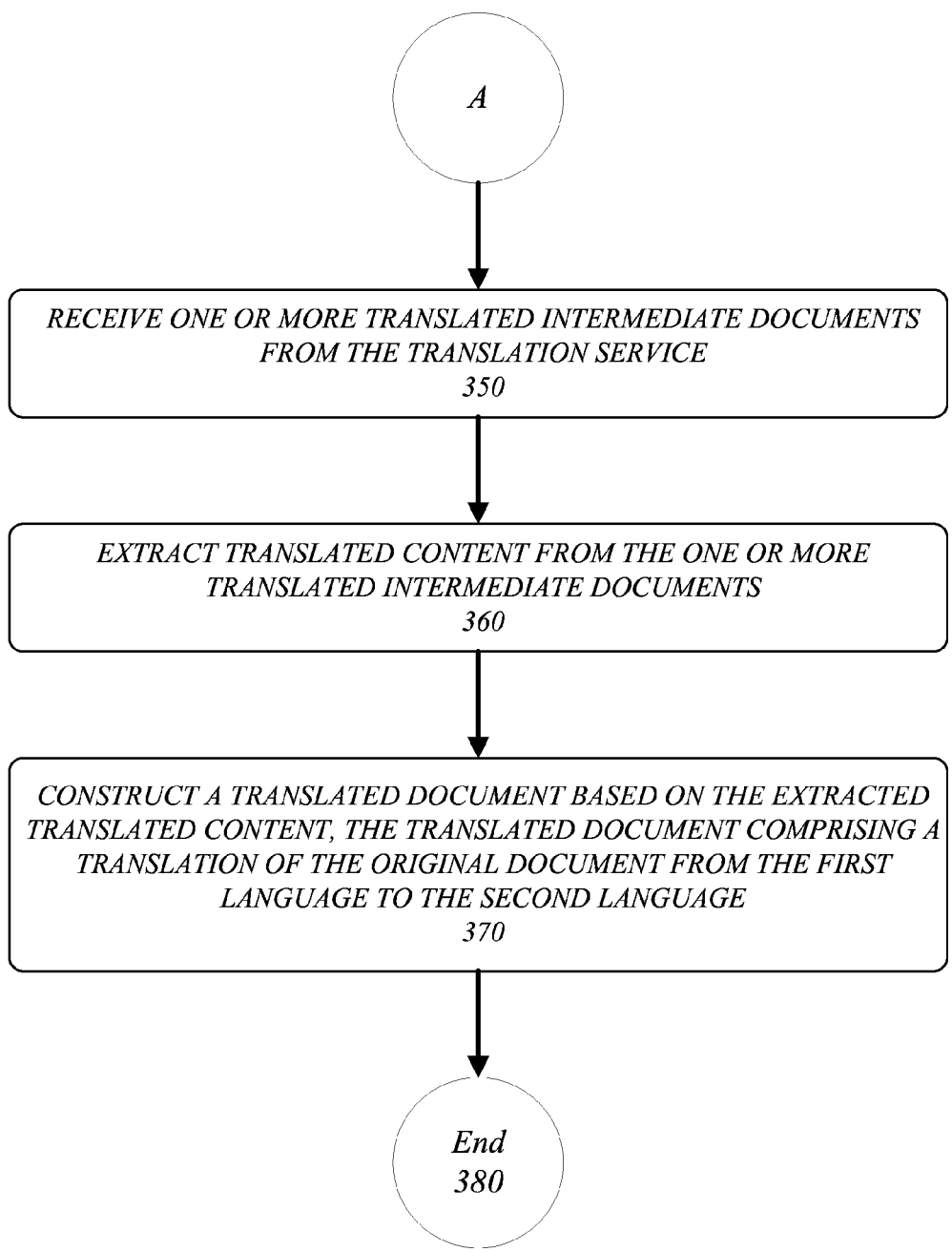
FIG. 3B illustrates an embodiment of a first logic flow for automated document translation.

FIG. 3B illustrates a continuation of the logic flow 300 from control point A as shown in FIG. 3A. Control point A merely represents a transition between block 340 of FIG. 3A and block 350 of FIG. 3B, and not necessarily a separate logic flow from the logic flow 300.

In block 350, one or more translated intermediate documents are received from the translation service.

In block 360, the translated content is extracted from the one or more translated intermediate documents. The process of extracting the translated content may comprise the operations of identifying one or more translated paragraphs in the translated intermediate documents, extracting translated text from the one or more translated paragraphs, associating the translated text of each translated paragraph with the associated predominant style identifier for the translated paragraph, identifying translated off-style runs in each translated paragraph, associating style identifiers with the text of each identified translated off-style run, identifying annotations in the translated intermediate documents, and associating annotation identifiers from the identified annotations with their place in the extracted translated text.

In block 370, a translated document is constructed based on the extracted translated content, the translated document comprising a translation of the original document from the first language to the second language. The process of constructing the translated document may comprise replacing the text from the one or more paragraphs of the original document with the extracted translated text from the translated paragraphs of the translated document, wherein styles are assigned to the extracted translated text using the associated style identifiers, wherein the inline objects from the original document are placed in the translated document based on the annotation identifiers associated with the extracted translated text.

Figure 4:
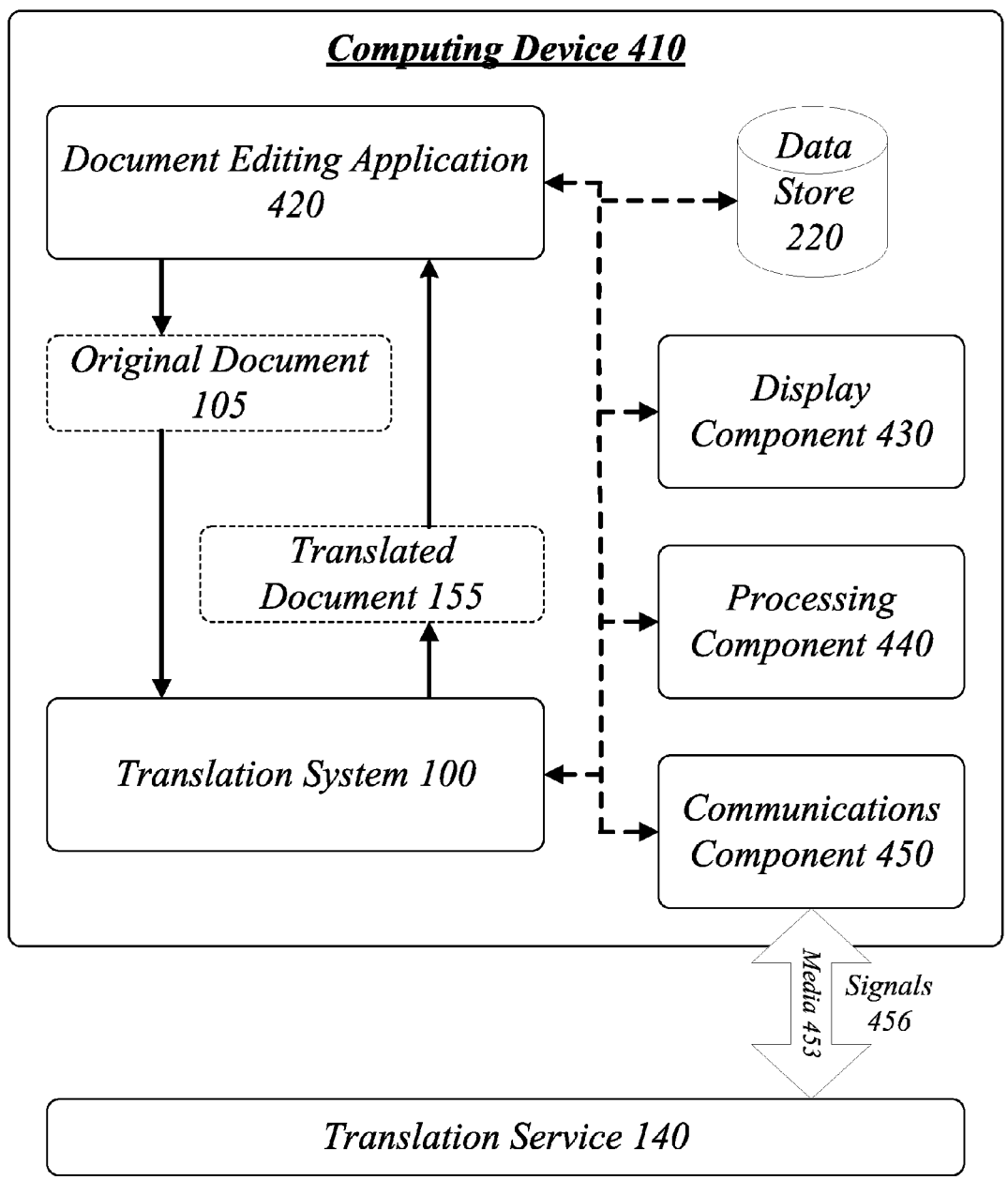
FIG. 4 illustrates an embodiment of a centralized system for automated document translation.

FIG. 4 illustrates a block diagram of a centralized system 400. The centralized system 400 may implement some or all of the structure and/or operations for the translation system 100 in a single computing entity, such as entirely within a single computing device 410.

The computing device 410 may display content or information, such as original document 105, using display component 430. The display component 430 may comprise various hardware element and software elements. In some embodiments, the display component 430 may comprise a video adaptor connected to a monitor, or any other means of displaying information to a user.

The computing device 410 may execute processing operations or logic for the translation system 100 using a processing component 440. The processing component 440 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 410 may execute communications operations or logic for the system 100 using communications component 450. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 453 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 453.

The computing device may comprise a document editing application 420 for the editing, creation, and viewing of documents. Document editing application 420 may comprise, for example, Microsoft Word, Microsoft Excel, or Microsoft PowerPoint, among other examples of application programs as described with reference to FIG. 1. Document editing application 420 may be operative to create, receive, view, or edit original document 105. Document editing application 420 may be operative to initiate the translation of original document 105 using the translation system 100, such as through a user invoking a command which requests an automated translation of a document. Document editing application 420 may be operative to receive the translated document 155 from the translation system 100. In various embodiments, the translation system 100 may comprise an integrated component of document editing application 420, such as where the application software for translation system 100 is integrated with the software for document editing application 420. Alternatively, translation system 100 may comprise an external application, an application component, or a system service accessible by a plurality of applications.

The computing device 410 may communicate with the translation service 140 over a communications media 453 using communications signals 456 via the communications component 450. Signals 456 transmitted over media 453 may comprise the transmission of the intermediate documents 125 from the translation system 100 to the translation service 140 and the transmission of the translated intermediate documents 135 from the translation service 140 to the translation system 100, such as is managed by the translation management component 130.

Figure 5:
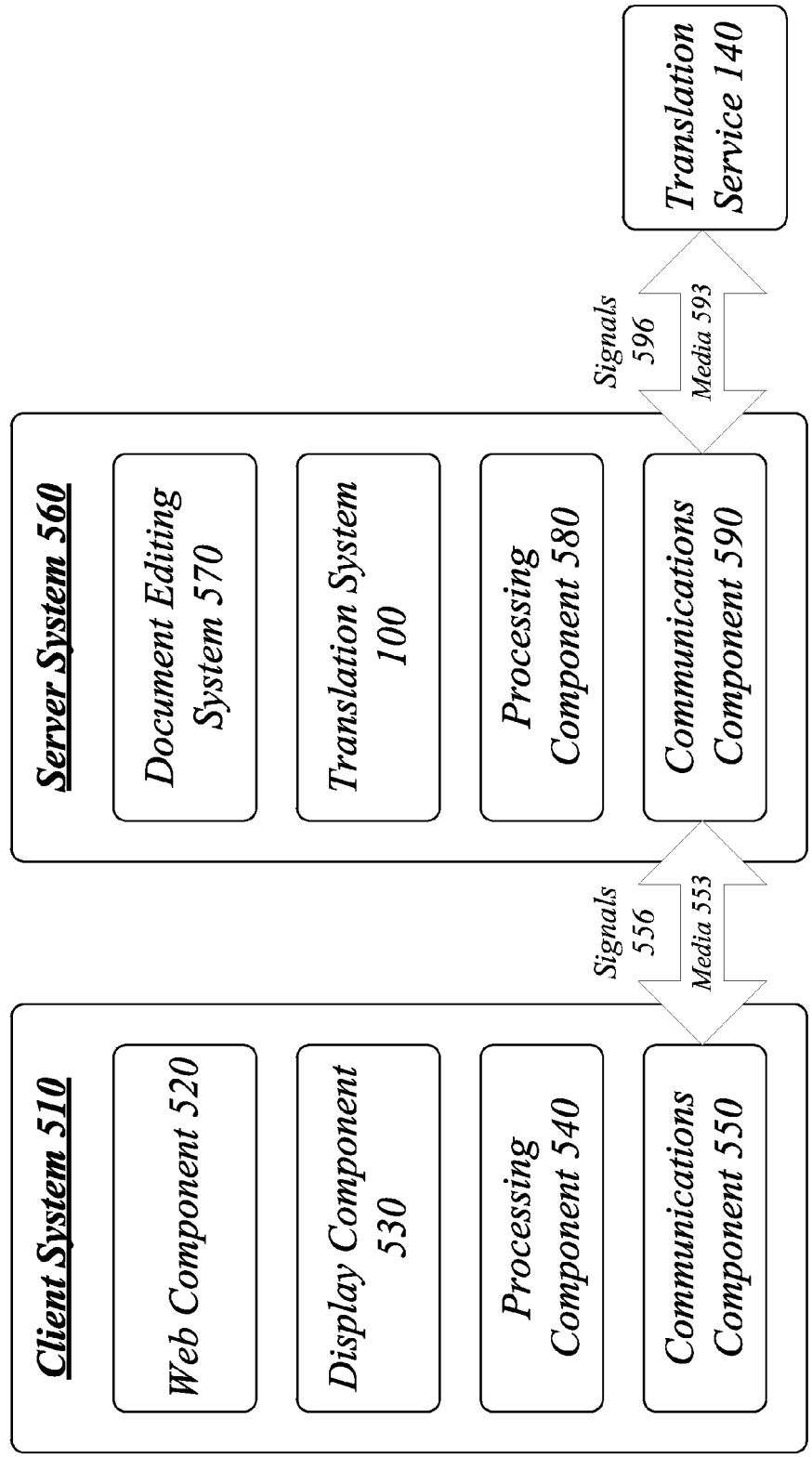
FIG. 5 illustrates an embodiment of a distributed system for automated document translation.

FIG. 5 illustrates a block diagram of a distributed system 500. The distributed system 500 may distribute portions of the structure and/or operations for the translation systems 100, 400 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 510 and the server system 560 may process information using the processing components 540 and 580, which are similar to the processing component 440 described with reference to FIG. 4. The client system 510 and the server system 560 may communicate with each over a communications media 553 using communications signals 556 via communications components 550 and 590, which are similar to the communications component 450 described with reference to FIG. 4. The client system 510 may display information for a user using display component 530 which is similar to the display component 430 described with reference to FIG. 4.

In various embodiments, the client system 510 may comprise or employ one or more client computing devices and/or client programs that operate to perform various methodologies in accordance with the described embodiments.

In various embodiments, the server system 560 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 560 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In one embodiment, for example, the distributed system 500 may be implemented as a client-server document management and editing system. A client system 510 may implement a web component 520 and display component 530 using processing component 540 and communications component 550. A server system 560 may implement a document editing system 570 and the translation system 100 using processing component 580 and communications component 590.

The document editing system 570 may comprise a web-accessible document editing system 570 empowering the creation, storage, sharing, and editing of documents over the web such as by using a common web browser. For instance, the document editing system 570 may comprise web-accessible or cloud computing versions of the application programs as described with reference to FIG. 1. Web component 520 may communicate with the document editing system 570 to utilize the web-accessible document editing system 570 to create, store, share, and edit documents such as original document 105 or translated document 155. Web component 520 may use the display component 530 to display documents for creation, editing, or reading by a user, such as original document 105 or translated document 155. As such, a user may be able to access documents such as original document 105 from a plurality of client devices which may implement the web component 520 and display component 530 of client system 510.

The document editing system 570 may allow for the invoking of the translation process using the translation system 100 by a user accessing the document editing system 570 using a common web browser such as web component 520. The translation system 100 may be operative to perform the translation of an original document 105 from a first language to a second language in response to this invocation and return the translated document 155 to the document editing system 570 for storage and use by the user of the web component 520.

Figure 6:
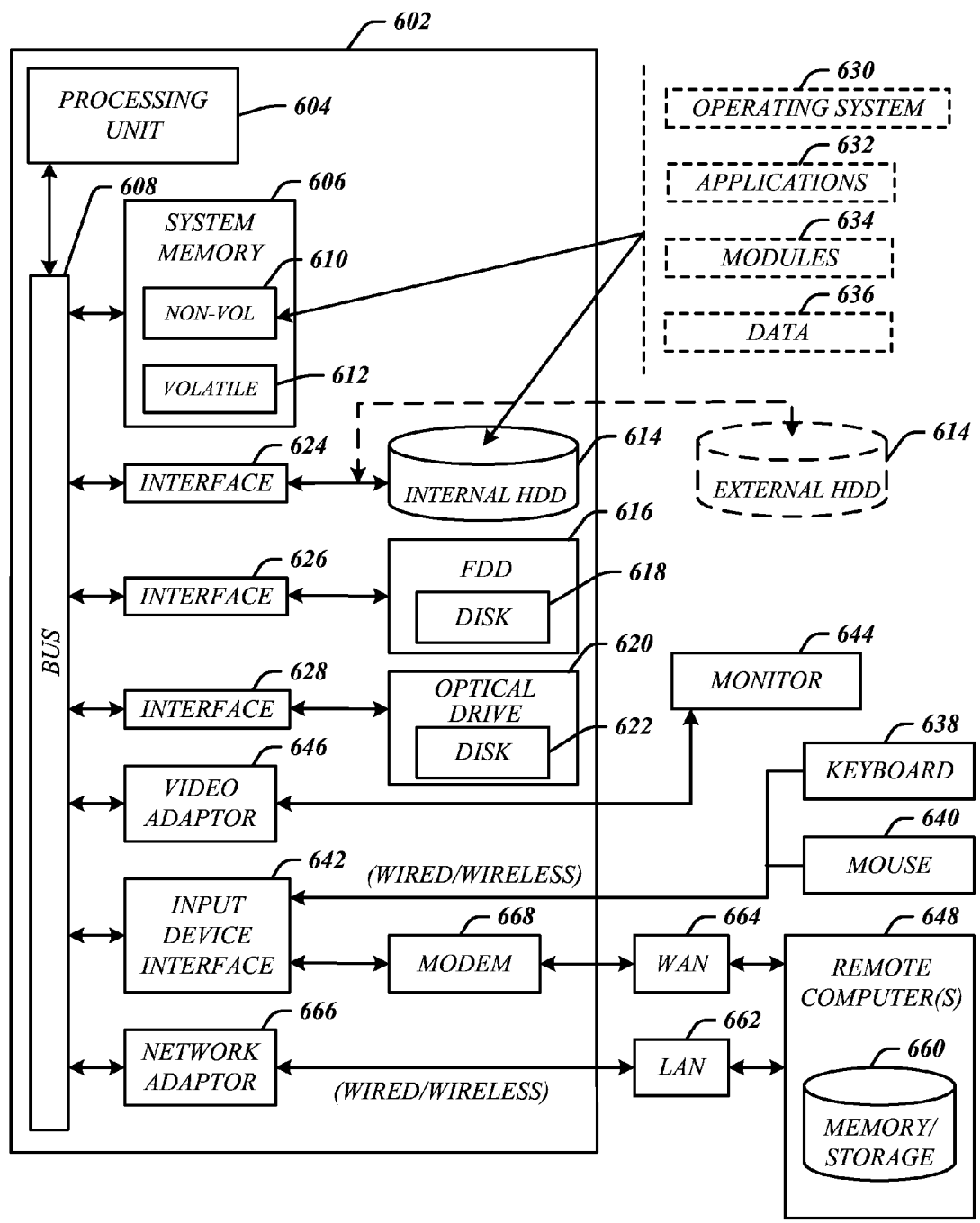
FIG. 6 illustrates an embodiment of a computing architecture suitable for automated document translation.

FIG. 6 illustrates an embodiment of an exemplary computing architecture 600 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program components can be stored in the drives and memory units 610, 612, including an operating system 630, one or more application programs 632, other program components 634, and program data 636.

The one or more application programs 632, other program components 634, and program data 636 can include, for example, translatable content component 110, intermediate component 120, translation management component 130, and selection component 210.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program components or modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
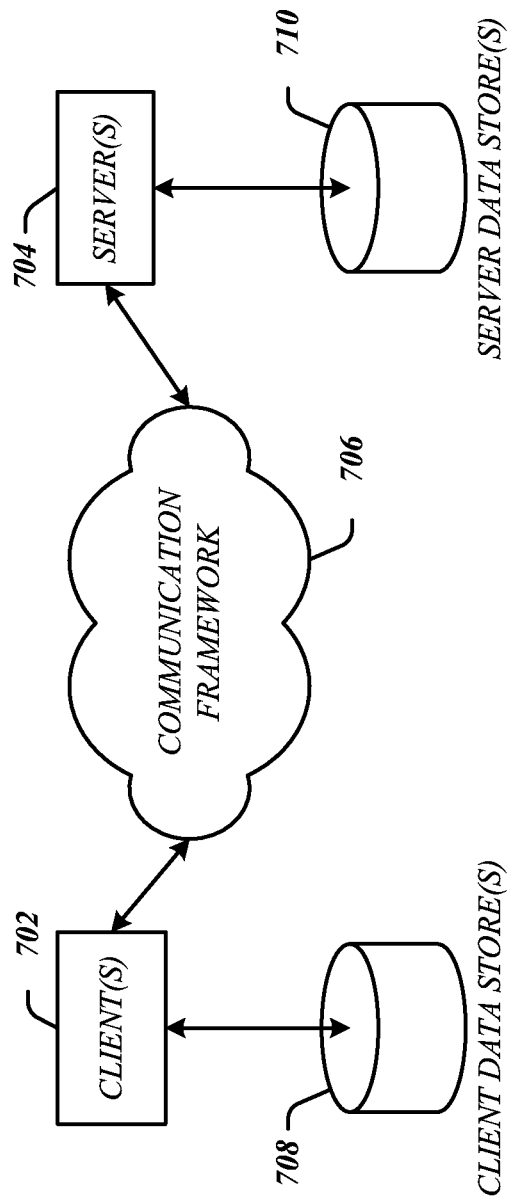
FIG. 7 illustrates an embodiment of a communications architecture suitable for automated document translation.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client system 510. The servers 704 may implement the server system 560. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols, such as those described with reference to translation system 100. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical constraints on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a logic device;
   a translatable content component operative on the logic device to extract translatable content from an original document, wherein the original document comprises text in a first language;
   an intermediate component operative on the logic device to create a plurality of intermediate documents from the extracted translatable content, wherein the plurality of intermediate documents includes the extracted translatable content, and wherein at least two of the intermediate documents are different from one another and independent from the file format for the original document;
   a translation management component operative on the logic device to transmit the one or more intermediate documents to a transition service and receive one or more translated intermediate documents from the translation service;
   the intermediate component operative on the logic device to extract translated content from the plurality of translated intermediate documents and associate an annotation identifier to an inline object; and
   the translatable content component operative on the logic device to construct a translated document based on the extracted translated content, the translated document comprising a translation of the original document from the first language to a second language.

2. The apparatus of claim 1, the translatable content component operative to extract the translatable content from the original document, the translatable content component to identify one or more paragraphs in the original document, extract text from the one or more paragraphs, generate one or more style identifiers for the extracted text, identify one or more runs of text.

3. The apparatus of claim 2, the intermediate component operative to create the plurality of intermediate documents from the extracted translatable content, the intermediate component to create paragraphs tags for each identified paragraph, identify a predominant style identifier for each paragraph, associate each paragraph with its predominant style identifier, identify off-style runs in each paragraph, create style tags for each off-style run, and create annotation tags from the annotation identifiers.

4. The apparatus of claim 3, the intermediate component operative to extract the translated content from the plurality of translated intermediate documents, the intermediate component to identify one or more translated paragraphs in the translated intermediate documents, extract translated text from the one or more translated paragraphs, associate the translated text of each translated paragraph with the associated predominant style identifier for the translated paragraph, identify translated off-style runs in each translated paragraph, associate style identifiers with the text of each identified translated off-style run, identify annotations in the translated intermediate documents, and associate annotation identifiers from the identified annotations with their place in the extracted translated text.

5. The apparatus of claim 4, the translatable content component operative to construct the translated document based on the extracted translated content by replacing the text from the one or more paragraphs of the original document with the extracted translated text from the translated paragraphs of the translated document, wherein styles are assigned to the extracted translated text using the associated style identifiers, wherein the inline objects from the original document are placed in the translated document based on the annotation identifiers associated with the extracted translated text.

6. The apparatus of claim 1, comprising:
   a selection component operative to select a translation parser from a plurality of translation parsers for the original document based on a document type of the original document;
   the translatable content component operative to extract the translatable content from the original document using the selected translation parser; and
   the translatable content component operative to construct the translated document based on the extracted translated content using the selected translation parser.

7. The apparatus of claim 1, the intermediate component operative to create the plurality of intermediate documents from the extracted translatable content to accommodate a defined number of pages for the translation service.

8. The apparatus of claim 1, wherein the plurality of intermediate documents are hypertext markup language (HTML) formatted.

9. A method, comprising:
   extracting translatable content from an original document, wherein the original document contains a first language;
   creating a plurality of intermediate documents from the extracted translatable content, wherein the plurality of intermediate documents includes the extracted translatable content, and wherein at least two of the intermediate documents are different from one another and independent from the file format for the original document;
   transmitting the plurality of intermediate documents to a translation service for translation from the first language to a second language;
   receiving one or more translated intermediate documents from the translation service;
   extracting translated content from the one or more translated intermediate documents; and
   constructing a translated document based on the extracted translated content, the translated document comprising a translation of the original document from the first language to the second language.

10. The method of claim 9, wherein extracting the translatable content from the original document further comprises:
   identifying one or more paragraphs in the original document;
   extracting text from the one or more paragraphs;
   generating one or more style identifiers for the extracted text;
   identifying one or more runs of text; and
   generating one or more annotation identifiers for inline objects in the original document.

11. The method of claim 10, wherein creating the plurality of intermediate documents from the extracted translatable content comprises:
   creating paragraphs tags for each identified paragraph;
   identifying a predominant style identifier for each paragraph;
   associating each paragraph with its predominant style identifier;
   identifying off-style runs in each paragraph;
   creating style tags for each off-style run; and
   creating annotation tags from the annotation identifiers.

12. The method of claim 11, wherein extracting the translated content from the translated intermediate documents comprises:
   identifying one or more translated paragraphs in the translated intermediate documents;
   extracting translated text from the one or more translated paragraphs; associating the translated text of each translated paragraph with the associated predominant style identifier for the translated paragraph;
   identifying translated off-style runs in each translated paragraph;
   associating style identifiers with the text of each identified translated off-style run;
   identifying annotations in the translated intermediate documents; and associating annotation identifiers from the identified annotations with their place in the extracted translated text.

13. The method of claim 12, wherein constructing the translated document based on the extracted translated content comprises:
   replacing the text from the one or more paragraphs of the original document with the extracted translated text from the translated paragraphs of the translated document, wherein styles are assigned to the extracted translated text using the associated style identifiers, wherein the inline objects from the original document are placed in the translated document based on the annotation identifiers associated with the extracted translated text.

14. The method of claim 9, comprising:
   selecting a translation parser from a plurality of translation parsers for the original document based on a document type of the original document;
   extracting the translatable content from the original document using the selected translation parser; and
   constructing the translated document based on the extracted translated content using the selected translation parser.

15. The method of claim 9, comprising creating the plurality of intermediate documents from the extracted translatable content to accommodate a defined number of pages for the translation service.

16. An article of manufacture comprising a storage medium containing instructions that when executed cause a system to:
   extract translatable content from an original document, wherein the original document contains a first language;
   create a plurality of intermediate documents from the extracted translatable content, wherein the plurality of intermediate documents includes the extracted translatable content, and wherein at least two of the intermediate documents are different from one another and independent from the file format for the original document;
   create a translated intermediate document;
   extract translated content from the translated intermediate document; and
   construct a translated document based on the extracted translated content, the translated document comprising a translation of the original document from the first language to a second language.

17. The article of claim 16, comprising instructions that when executed cause the system to:
   identify one or more paragraphs in the original document;
   extracting text from the one or more paragraphs;
   generating one or more style identifiers for the extracted text;
   identify one or more runs of text; and
   generate one or more annotation identifiers for inline objects in the original document.

18. The article of claim 17, comprising instructions that when executed cause the system to:
   create paragraphs tags for each identified paragraph;
   identify a predominant style identifier for each paragraph;
   associate each paragraph with its predominant style identifier;
   identify off-style runs in each paragraph;
   create style tags for each off-style run; and
   create annotation tags from the annotation identifiers.

19. The article of claim 18, comprising instructions that when executed cause the system to:
   identify one or more translated paragraphs in the translated intermediate document;
   extract translated text from the one or more translated paragraphs;
   associate the translated text of each translated paragraph with the associated predominant style identifier for the translated paragraph;
   identify translated off-style runs in each translated paragraph;
   associate style identifiers with the text of each identified translated off-style run; identify annotations in the translated intermediate documents; and
   associate annotation identifiers from the identified annotations with their place in the extracted translated text.

20. The article of claim 19, comprising instructions that when executed cause the system to replace the text from the one or more paragraphs of the original document with the extracted translated text from the translated paragraphs of the translated document, wherein styles are assigned to the extracted translated text using the associated style identifiers, wherein the inline objects from the original document are placed in the translated document based on the annotation identifiers associated with the extracted translated text.

* * * * *